(12) United States Patent
Bespalov et al.

(10) Patent No.: US 8,112,228 B2
(45) Date of Patent: Feb. 7, 2012

(54) STATISTICAL CORRECTION FOR STANDOFF IN TWO-TERMINAL IMAGER OPERATING IN OIL-BASED MUD

(75) Inventors: Alexandre N. Bespalov, Spring, TX (US); Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 551 days.

(21) Appl. No.: 12/125,214

(22) Filed: May 22, 2008

(65) Prior Publication Data

US 2009/0292471 A1 Nov. 26, 2009

(51) Int. Cl.
  *G01V 3/38* (2006.01)
  *G01V 3/08* (2006.01)
  *G01V 3/18* (2006.01)
  *G01V 3/26* (2006.01)

(52) U.S. Cl. ............... 702/7; 702/6; 702/11; 702/13

(58) Field of Classification Search .............. 702/6, 7, 702/9, 11–13, 48, 182, 183; 76/108.2; 175/25, 175/40; 324/339, 357, 367, 374; 340/853.1
See application file for complete search history.

(56) References Cited

U.S. PATENT DOCUMENTS

| | | | | |
|---|---|---|---|---|
| 5,703,773 | A | * | 12/1997 | Tabarovsky et al. ............... 702/7 |
| 5,999,883 | A | * | 12/1999 | Gupta et al. ....................... 702/7 |
| 6,597,993 | B2 | * | 7/2003 | Strickland et al. ................. 702/7 |
| 6,714,014 | B2 | | 3/2004 | Evans et al. |
| 6,809,521 | B2 | * | 10/2004 | Tabarovsky et al. ........... 324/374 |
| 7,365,545 | B2 | * | 4/2008 | Itskovich et al. .............. 324/367 |
| 7,397,250 | B2 | * | 7/2008 | Bespalov et al. .............. 324/357 |
| 7,463,035 | B2 | * | 12/2008 | Merchant et al. ............. 324/339 |
| 2003/0173968 | A1 | | 9/2003 | Cheung et al. |
| 2003/0222651 | A1 | | 12/2003 | Tabanou |

\* cited by examiner

*Primary Examiner* — Michael Nghiem
*Assistant Examiner* — Felix Suarez
(74) *Attorney, Agent, or Firm* — Mossman Kumar & Tyler (57) ABSTRACT

An apparatus, method and computer-readable medium for estimating a resistivity property of an earth formation in a borehole filled with oil-based mud. The method includes conveying a logging tool into a borehole; measuring a plurality of impedance values of the earth formation, each of the plurality of impedance values being obtained at one of a plurality of measure electrodes on the logging tool; determining a coefficient related to an electrical property of the mud from a plurality of pairs of impedance values; estimating the resistivity property of the formation from the determined coefficient; and recording the resistivity property on a suitable medium.

12 Claims, 7 Drawing Sheets

STATISTICAL CORRECTION FOR STANDOFF IN TWO-TERMINAL IMAGER OPERATING IN OIL-BASED MUD

BACKGROUND OF THE DISCLOSURE

1. Field of the Disclosure

The present disclosure is related to methods for measuring a resistance of an earth formation downhole. In particular, the present disclosure is related to providing a correction for standoff in resistance measurements.

2. Description of the Related Art

In oil exploration, resistivity measurements of an earth formation are typically obtained by lowering a resistivity tool into a borehole penetrating the formation. Generally, the tool includes at least one current transmitter which introduces current into the formation and at least one return electrode at which current returns to the tool. Resistance is measured between the two electrodes. Ideally, current flows directly from the current transmitter through the earth formation and returns through the return electrode. In typical downhole situations, however, the resistivity tool is separated from the formation by a gap filled with oil-based mud that is used for the purposes of drilling. The gap may be uniform along the length of the borehole or may experience variations due to borehole rugosity. The presence of mud and borehole rugosity affects the value of resistivity measurements obtained from the formation.

Several methods are used to reduce the effect of borehole irregularities and standoff, such as obtaining dual frequency measurements and post-processing based on a corresponding calculation; deriving a mud parameter $\alpha=(\rho_m \omega \in_m \in_0)^{-1}$ from direct mud cell measurements; and obtaining multi-standoff measurements and post-processing based on a corresponding calculation; among others. These methods rely on obtaining an additional measurement to derive the mud parameter and can require new tool designs and/or assumptions about the dispersive characteristics of the mud. Thus, there is a need to provide a correction to resistivity measurements in the presence of the oil-based mud in a gap based on an analysis of the data and which does not require any additional measurements or prior information about the mud's electrical properties. The present disclosure satisfies this need.

SUMMARY OF THE DISCLOSURE

The present disclosure provides a method of estimating a resistivity property of an earth formation in a borehole filled with oil-based mud, including: conveying a logging tool into a borehole; measuring a plurality of impedance values of the earth formation, each of the plurality of impedance values being obtained at one of a plurality of measure electrodes on the logging tool; determining a coefficient related to an electrical property of the mud from a plurality of pairs of impedance values; estimating the resistivity property of the formation from the determined coefficient; and recording the resistivity property on a suitable medium.

In one aspect, the coefficient may be determined using a relationship of the form $$\alpha = \frac{\sum_{j=1}^{N} (A_j^{(1)} - A_j^{(2)})(B_j^{(1)} - B_j^{(2)})}{\sum_{j=1}^{N} (B_j^{(1)} - B_j^{(2)})^2}$$

where $\alpha$ is the coefficient, $A_j$ is a real part of a measured impedance value for a $j^{th}$ signal pair and $B_j$ is an imaginary part of the measured impedance measured for the t signal pair. In another aspect, determining the coefficient may include averaging over the plurality of impedance values. In one aspect, the method updates the determined coefficient using $$\alpha_{updated} = \frac{(1-\delta)\text{Re}Z}{\text{Im}Z}$$

where Z is the complex impedance measure at a measure electrode and $\delta$ is a regularizing parameter. Correction may be made to include a systematic electronic phase error. The logging tool may be conveyed into the borehole on a conveyance device selected from (i) a wireline, and (ii) a drilling tubular.

The present disclosure also provides an apparatus for estimating a resistivity property of an earth formation in a borehole filled with oil-based mud, and includes: a logging tool configured to be conveyed into a borehole; a plurality of measure electrodes on the logging tool configured to measure a plurality of impedance values of the earth formation; and a processor configured to: (a) determine a coefficient related to the electrical property of the mud from each of a plurality of pairs of impedance values, and (b) estimate the resistivity property of the formation from the determined coefficient. In one aspect, the processor is configured to determine the coefficient using a relationship of the form $$\alpha = \frac{\sum_{j=1}^{N} (A_j^{(1)} - A_j^{(2)})(B_j^{(1)} - B_j^{(2)})}{\sum_{j=1}^{N} (B_j^{(1)} - B_j^{(2)})^2}$$

where $\alpha$ is the coefficient, $A_j$ is a real part of a measured impedance value for a $j^{th}$ signal pair and $B_j$ is an imaginary part of the measured impedance measured for the $j^{th}$ signal pair. In another aspect, the processor may also be configured to determine the coefficient by averaging over the plurality of pairs of impedance values. In another aspect, the processor may be configured to update the determined coefficient using $$\alpha_{updated} = \frac{(1-\delta)\text{Re}Z}{\text{Im}Z}$$

where Z is the complex impedance measure at a measure electrode and $\delta$ is a regularizing parameter. The processor may be further configured to correct for a systematic electronic phase error. The logging tool may be configured to be conveyed into the borehole on a conveyance device selected from (i) a wireline, and (ii) a drilling tubular.

Another aspect of the invention provides a computer-readable medium for use with a tool for determining a resistivity parameter of an earth formation in a borehole. The tool includes a logging tool configured to be conveyed into a borehole and a plurality of measure electrodes on the logging tool configured to measure a plurality of impedance values of the earth formation. The medium includes instructions which enable a processor to: determine a coefficient related to an electrical property of the mud from each of a plurality of pairs of impedance values, estimate the resistivity property of the formation from the determined coefficient, and record the resistivity property on a suitable medium. The medium may be at least one of (i) a ROM, (ii) and EPROM, (iii) an EEPROM, (iv) a flash memory, and (v) an optical disk.

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

Figure 1:
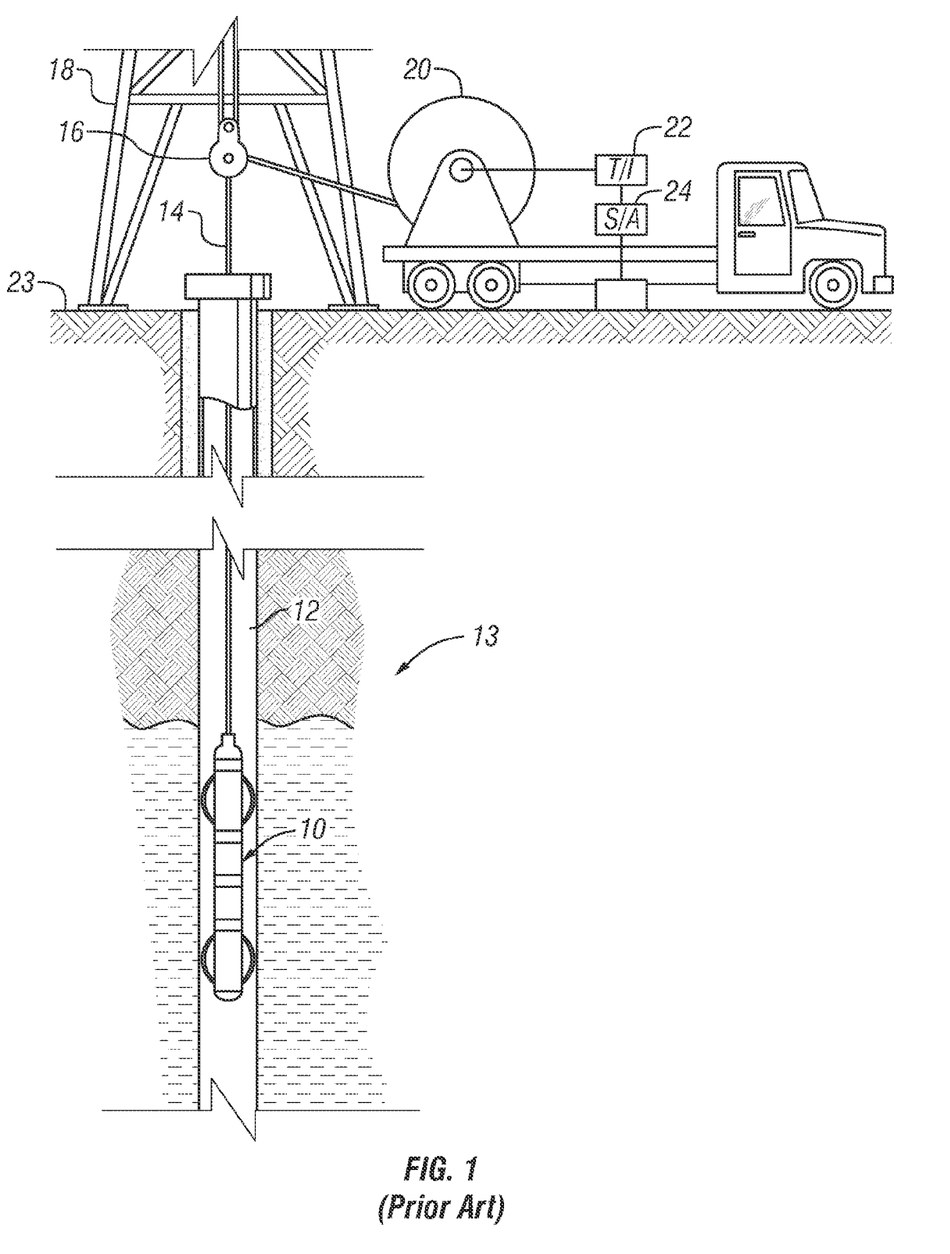
FIG. 1 (prior art) shows an exemplary imaging tool suspended from a suitable cable into a borehole that penetrates an earth formation.

FIG. 1 shows an exemplary imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2A:
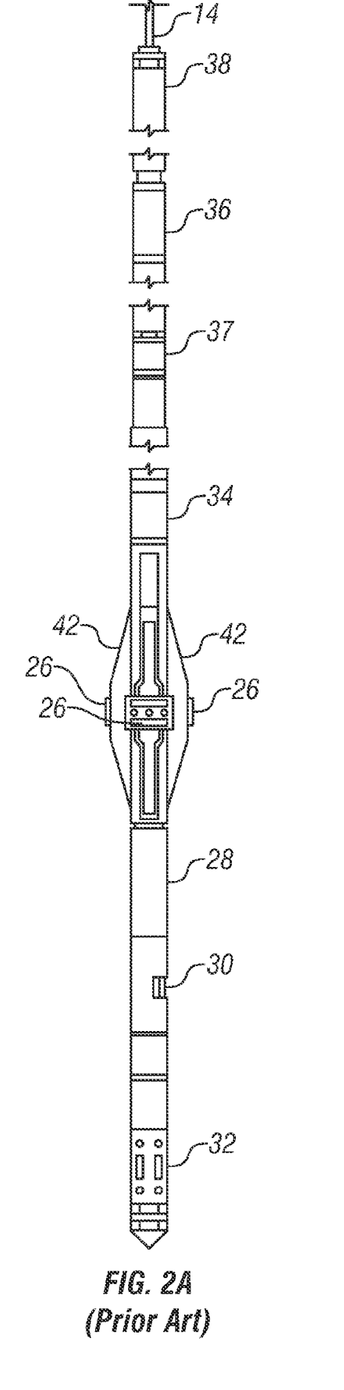
FIG. 2A (prior art) is a schematic external view of an exemplary borehole sidewall imager system according to one aspect of the present disclosure.

FIG. 2A is a schematic external view of an exemplary borehole sidewall imager system according to one aspect of the present disclosure. The tool 10 including the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Figure 2B:
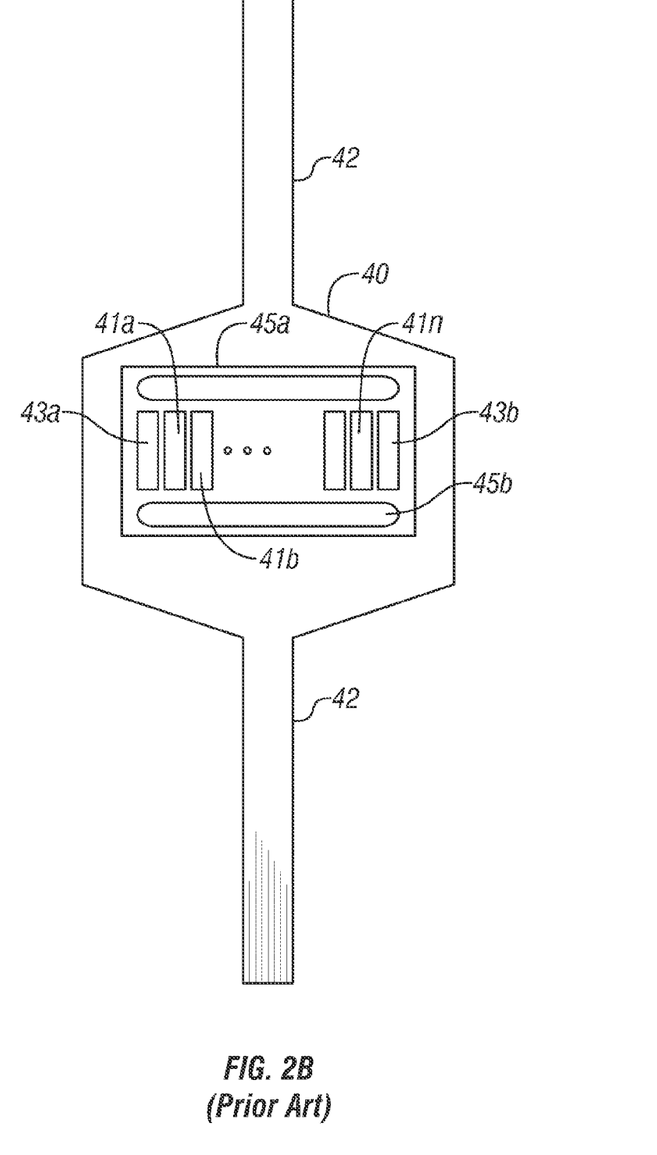
FIG. 2B shows an array including electrodes for injecting electrical currents into the formation.

Also shown in FIG. 2A are three resistivity arrays 26 (a fourth array is hidden in this view). Referring to FIGS. 2A and 2B, each array includes measure electrodes $41a, 41b, \ldots 41n$ for injecting electrical currents into the formation, focusing electrodes $43a, 43b$ for horizontal focusing of the electrical currents from the measure electrodes and focusing electrodes $45a, 45b$ for vertical focusing of the electrical currents from the measure electrodes. By convention, "vertical" refers to the direction along the axis of the borehole and "horizontal" refers to a plane perpendicular to the vertical.

Figure 3:
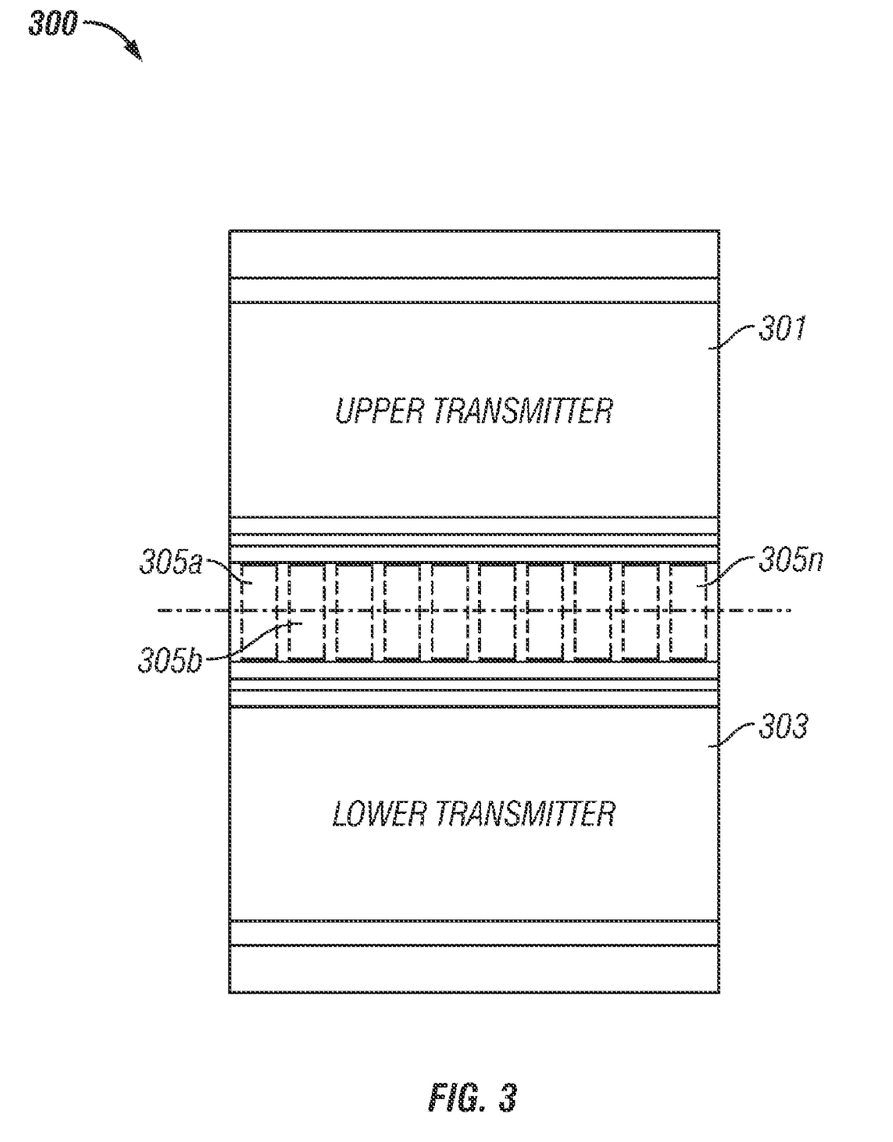
FIG. 3 illustrates a High Frequency Two-Terminal Galvanic Imager typically used to obtain a plurality of resistance measurements of a formation in a borehole.

FIG. 3 illustrates a High Frequency Two-Terminal Galvanic Imager 300 typically used to obtain a plurality of resistance measurements of a formation in a borehole. The imager 300 includes an upper transmitter 301 and a lower transmitter 303 for injecting currents into the formation. Resistance measurements are obtained at the measure electrodes $305a$, $305b, \ldots, 305n$. In the illustration of FIG. 3, the measure electrodes are place azimuthally. This is not meant as a limitation of the disclosure. In another aspect, a plurality of vertically displaced measure electrodes may correspond to the vertically displaced current electrodes. In yet another aspect, the plurality of measure electrodes may include a combination of vertically and azimuthally displaced measure electrodes.

In normal operation, the current loop includes the earth formation as well as mud occupying the standoff gap between the imager 300 and the formation. Thus, neglecting any dielectric effect of the formation, the complex impedance Z measured by the imager 300 may be approximately represented in the form:

$$Z = R_f + ReZ_G + iImZ_G \qquad (1)$$

where $R_f$ is an active (real-valued) formation resistance, and $Z_G$ is the complex impedance of the standoff ("gap impedance") between the pad and the borehole wall. While the measurement of Eq. (1) includes the complex impedance of the mud, $Z_G$, this term is considered to be a parasitic term that is to be removed. In other words, it is desirable to isolate the formation resistivity $R_f$ in Eq. (1). The imaginary part of the gap impedance $Z_G$ can typically be filtered out by the phase-sensitive measurements. The correction for the real part of the gap impedance $Re(Z_G)$ may be determined using the exemplary method of the present disclosure.

There is a simple relationship between the real and imaginary parts of the gap impedance:

$$ReZ_G = \alpha ImZ_G$$

where the coefficient $\alpha$ depends on electrical parameters of the mud:

$$\alpha = (\rho_m \omega \in_m \in_0)^{-1}$$

and $\rho_m$ and $\in_m$ are resistivity and permittivity values of a mud and $\omega=2\pi f$ is the angular frequency of the applied current. If a value of the coefficient $\alpha$ is known, then it is possible to use this coefficient to correct for the gap impedance using:

$$R_f = ReZ - \alpha ImZ \quad (2)$$

Denoting the real and the imaginary part of the impedance Z by A and B respectively, for convenience, the gap impedance may be written as:

$$Z = A + iB$$

Taking into account Eq. (2), then $$R_f + \alpha B = A$$

It is useful to consider a set of two signals $Z^{(1)}$ and $Z^{(2)}$ corresponding to two vertically or azimuthally adjacent points, such as points indicated by sensors 305a, 305b of FIG. 3:

$$R_f^{(1)} + \alpha B^{(1)} = A^{(1)} \quad R_f^{(2)} + \alpha B^{(2)} = A^{(2)} \quad (3)$$

It follows from Eq. (3) that the following equality holds:

$$\alpha + \frac{R_f^{(1)} - R_f^{(2)}}{B^{(1)} - B^{(2)}} = \frac{A^{(1)} - A^{(2)}}{B^{(1)} - B^{(2)}} \quad (4)$$

Thus, it is possible to consider an ensemble of adjacent points, including an extended set of N adjacent "signal pairs"

$$(Z_1^{(1)}, Z_1^{(2)}), (Z_2^{(1)}, Z_2^{(2)}), \ldots, (Z_N^{(1)}, Z_N^{(2)}) \quad (5)$$

where N is a large number and all the signal pairs are taken from a small portion of a log. These two requirements do not contradict each other since the vertical image sampling step is always small, and there are tens of sensor buttons placed azimuthally. (Note that the same signal Z may be used in several signal pairs.) Furthermore: 1) the coefficient $\alpha$ is the same for all pairs (i.e., the mud is homogeneous within the considered part of a well), and 2) variation of the formation resistance $R_f$ is not correlated with variation of the imaginary part of the impedance B caused by the variable standoff and/or borehole rugosity.

Eq. (4) can therefore be averaged over the whole ensemble (of Eq. (5)). Due to the second statement above (e.g., the lack of correlation between $R_f$ and B), the second term on the left-hand side of Eq. (4) is randomly distributed with zero mean (it has equal probability to be positive or negative for a given current pair). Thus, when the average of Eq. (4) is taken over N sensors, the contribution of this term to the average decreases by a factor of $\sqrt{N}$. One can expect that for at least a majority of pairs of the adjacent points, the absolute values of terms in $R_f^{(1)} - R_f^{(2)}$ are small.

Averaging Eq. (4) therefore gives the following estimate:

$$\alpha \approx \left\langle \frac{A_j^{(1)} - A_j^{(2)}}{B_j^{(1)} - B_j^{(2)}} \right\rangle_{averaged\ over\ j=1\ldots N} \quad (6)$$

A concrete method is introduced to perform the averaging of Eq. (6). It is empirically found that the best choice of a weight of each pair j is:
which leads to Eq. (7):

$$\alpha = \frac{\sum_{j=1}^{N} (A_j^{(1)} - A_j^{(2)})(B_j^{(1)} - B_j^{(2)})}{\sum_{j=1}^{N} (B_j^{(1)} - B_j^{(2)})^2}. \quad (7)$$

A correction with this value of $\alpha$ is in fact the orthogonalization of a vector $\{A_j^{(1)} - A_j^{(2)}\}_{j=1}^{N}$ to a vector $\{B_j^{(1)} - B_j^{(2)}\}_{j=1}^{N}$, so that the "energy" of the corrected signal is minimized:

$$\sum_{j=1}^{N} (R_{f,j}^{(1)} - R_{f,j}^{(2)})^2 = \min. \quad (8)$$

The value of $\alpha$ calculated by the exemplary method may contain some statistical and systematic error. In one aspect, to reduce error amplification, one imposes the following regularizing "protective" condition:

$$ReZ - \alpha ImZ \geq \delta ReZ \quad (9)$$

Eq. (9) restrains the original signal from being diminished by the correction of Eq. (2) by more than by a factor of $1/\delta$. Thus, for each logging point:

$$\text{if } ReZ - \alpha ImZ < \delta ReZ \text{ then } \alpha_{updated} := \frac{(1-\delta)ReZ}{ImZ}. \quad (10)$$

In one aspect, to ensure enforcement of the condition of Eq. (9), the step of Eq. (10) is added before applying the correction of Eq. (2).

FIGS. 4-9 show the effects of the method of the present disclosure on logs obtained from various formation benchmarks. The method of the present disclosure is verified in numerical experiments for several 2D benchmark models. The pad of the considered imager used is depicted in FIG. 3. Corrections are performed using Eq. (2) where the value of $\alpha$ is calculated according to Eq. (7) and, when appropriate, is updated according to Eq. (10). The data set ensemble includes all the pairs of adjacent logging points. Thus, the condition of Eq. (9) is enforced by applying the step of Eq. (10) with a parameter value of $\delta=0.1$. In the logs of FIGS. 4-9, the operational frequency is 10 MHz, and the mud parameters are $\rho_m=5,000$ ohm-m, $\in_m=5$ (which is close to the mud properties measured in the lab). The true value of $\alpha$ is 0.072. The borehole diameter is 8.5".

Figure 4:
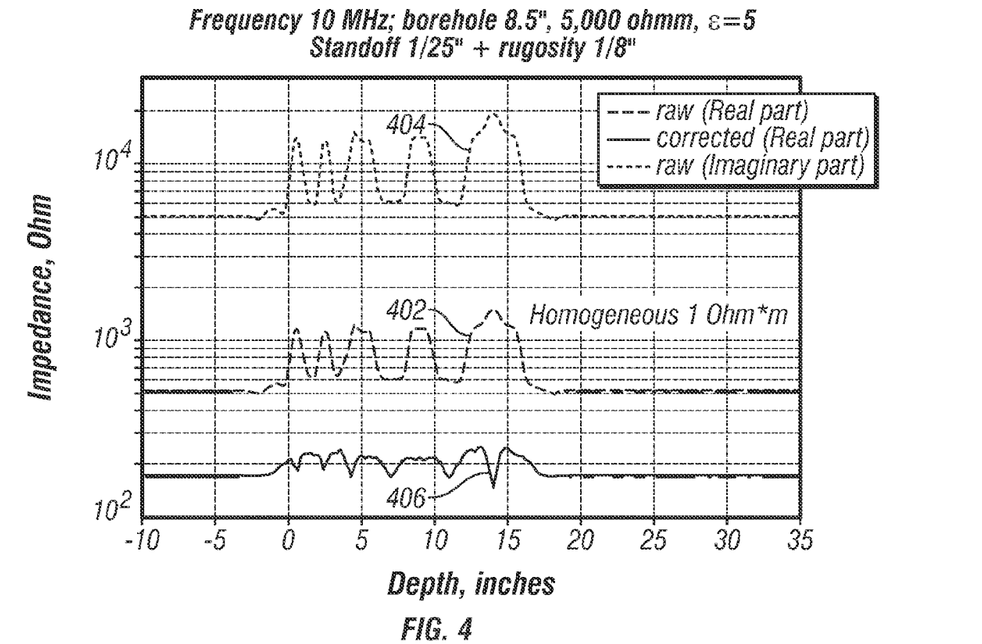
FIG. 4-5 show raw and corrected logs of formation resistance obtained using the methods of the present disclosure in a borehole with rugosity.

FIG. 4 shows raw and corrected logs of formation resistance obtained using the methods of the present disclosure in a borehole having 8.5" diameter, with small (⅛" deep) rugosity. The formation is homogeneous. Formation resistivity is 1 ohm-m and formation permittivity is 20. The common pad-formation standoff is 1/25", and there are several "expanded" places where the borehole radius is greater by ⅛" than its basic value 4.25" due to rugosity. The vertical heights of these expanded places are 1", 2", and 3".

Although the formation resistivity is constant, the real part 402 of the raw signal varies over a range of about 9.5 dB. This variation is purely parasitic, caused by the rugosity of the borehole. The imaginary part 404 of the raw signal is also shown. Using the methods of the present disclosure, under the conditions of FIG. 4, Eq. (7) produces a value of α=0.0675, i.e. the discrepancy between calculated and real values of α is about 6%. No updates are made to the value of α using Eq. (10) since the criterion of Eq. (9) is satisfied everywhere for the original value of α provided by Eq. (7). The corrected signal 406 obtained using Eq. (2) has a dynamic range of about 3.5 dB. The correction thus reduces the parasitic variation of the formation resistivity measurement by a factor of 2.7.

Figure 5:
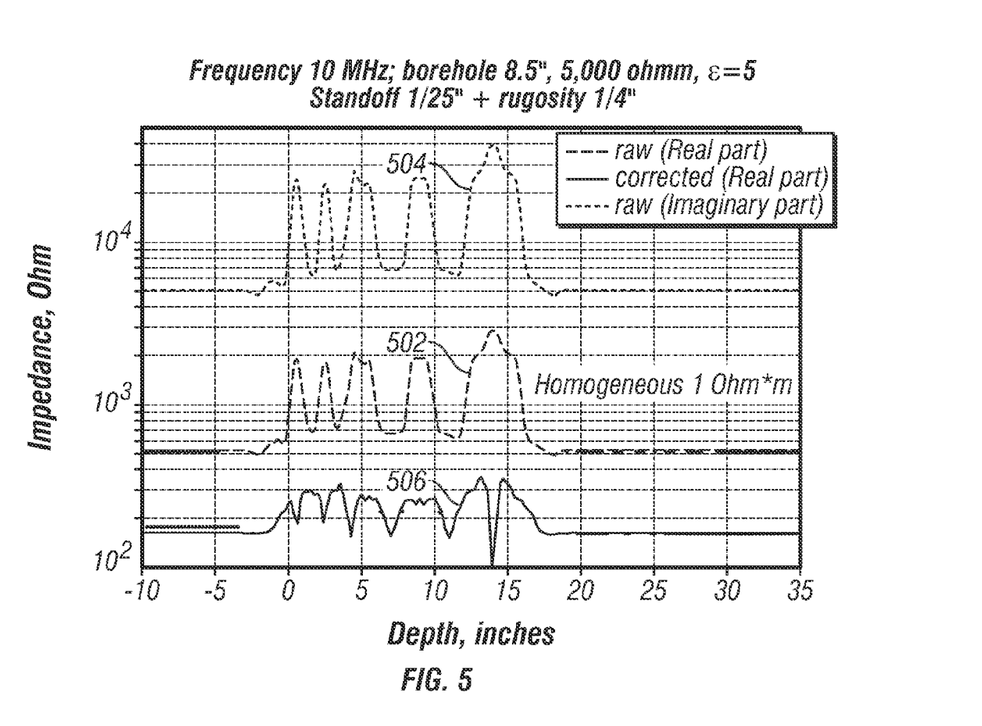

The logs of FIG. 5 are obtained in a borehole with 8.5", with moderate (¼" deep) rugosity, crossing homogeneous whole-space. The real part 502 and the imaginary part 504 of the raw signal are shown. The real part 502 of the raw signal varies over a range of about 15.6 dB. Under the condition of FIG. 5, Eq. (7) produces a value of α=0.067 (i.e. the discrepancy between calculated and real values is about 7%). Eq. (10) is not used to update the value of α. The resulting corrected signal 506 has a dynamic range of about 6 dB. In other words, the correction reduces the parasitic variation by a factor of 2.6.

Figure 6:
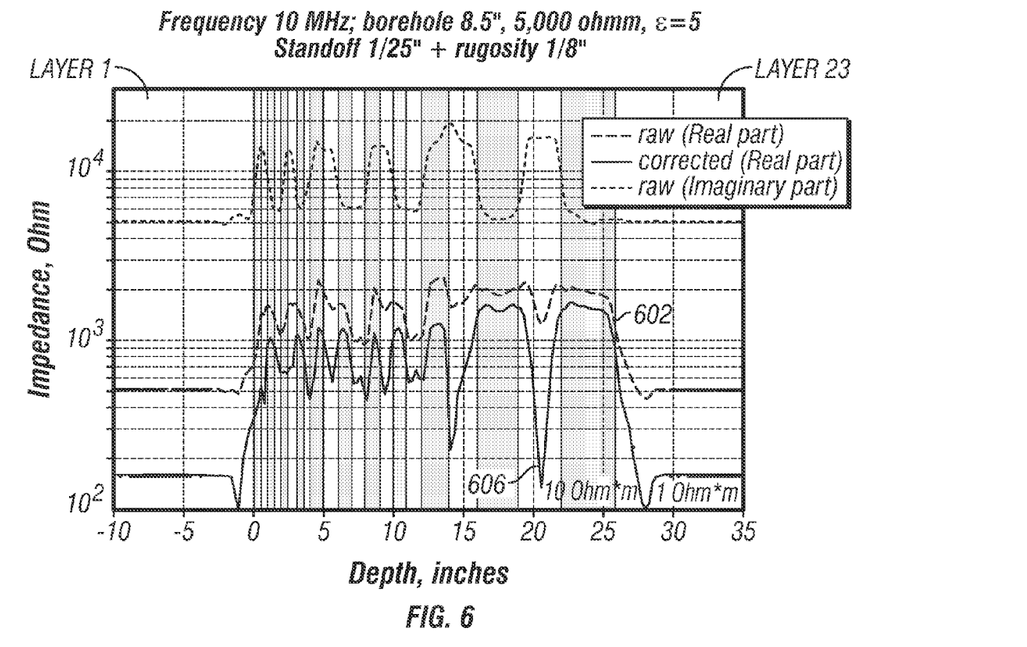
FIGS. 6-9 shows raw and corrected logs obtained from exemplary benchmark formations having several layers.

FIGS. 6-9 shows raw and corrected logs obtained from an exemplary benchmark formation including several layers. The formation includes 23 layers, in which the first and the last layers are shoulders of infinite thickness. The layers display increasing thicknesses: layers 2-9 are ½" thick; layers 10-17 are 1" thick; layers 18-19 are 2" thick; layers 20-21 are 3" thick; and layer 22 is 4" thick. In FIG. 6, the odd-numbered formation layers have resistivity 1 ohm-m and permittivity 20. The even-numbered formation layers have resistivity 10 ohm-m and permittivity 10. Thus, the contrast between the resistivity of odd and even layers is a factor of 10. The common pad-formation standoff is ½₅", and layers 2-3; 6-7; 10-11; 14-15; 18-19; 21 have an additional ⅛" standoff due to rugosity. Under the conditions stated with respect to FIG. 6, Eq. (7) produces a value α=0.096, i.e. the discrepancy between real and calculated values is about 33%. The regularizing Eq. (10) updates the value to α=0.072. It can be seen in FIG. 6 that the corrected signal 606 reflects the true bedding resistivity better than the real part 602 of the raw signal.

Figure 7:
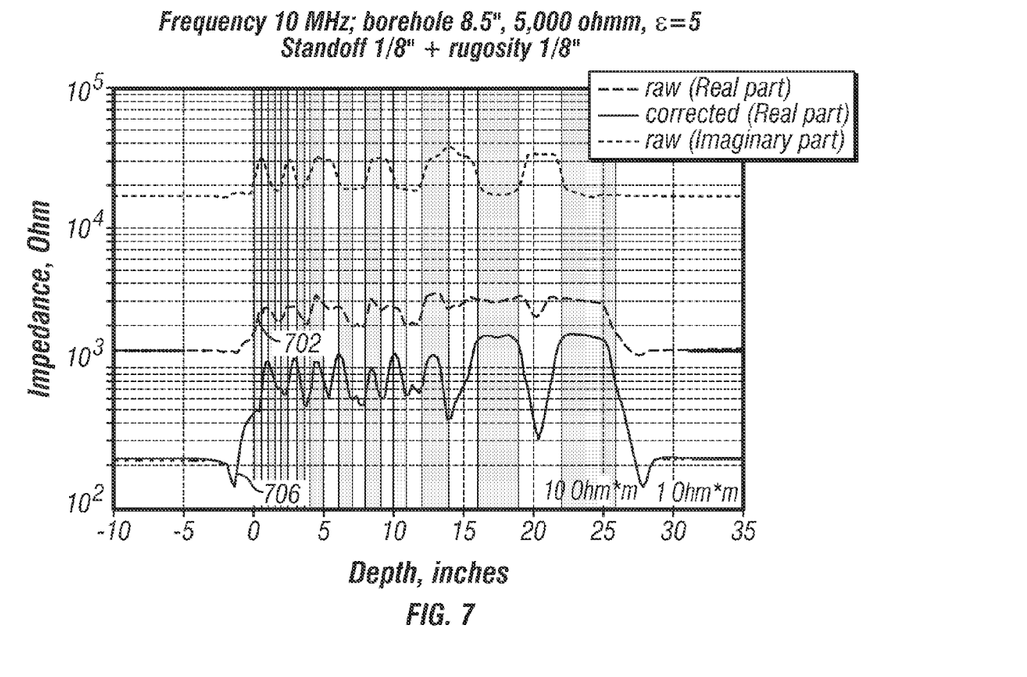

FIG. 7 shows a log obtained from a formation have the same layer structure as shown in FIG. 6 and same conditions except that the common pad-formation standoff is ⅛". Eq. (7) produces a value α=0.069, i.e. the discrepancy between real and calculated values is about 4%. The regularizing Eq. (10) updates the value to α=0.067. An improvement of the real part 702 of the raw signal can be seen in the corrected signal 706.

Figure 8:
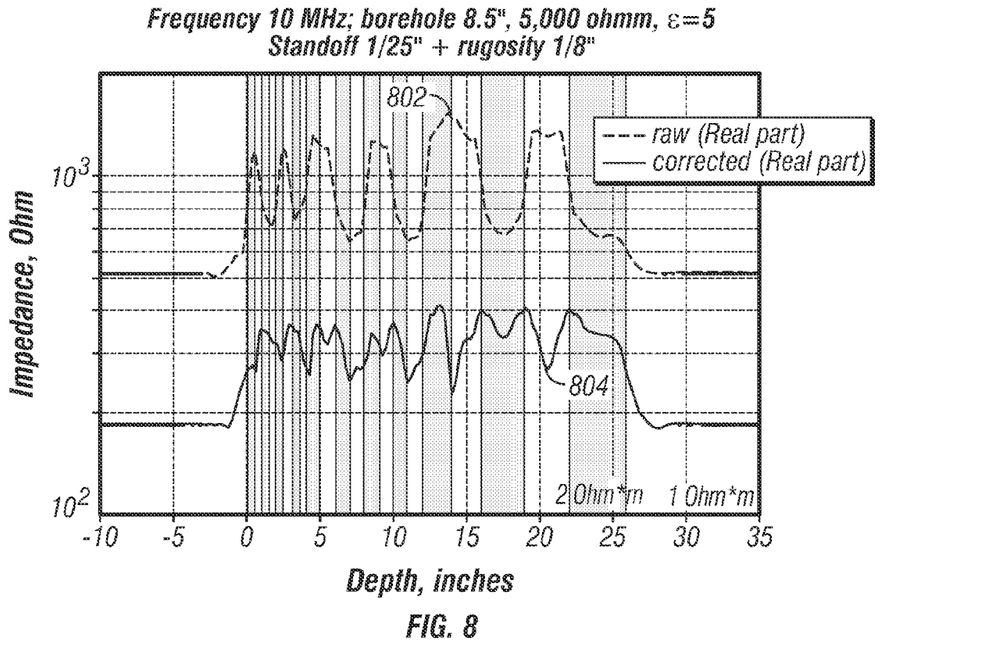

FIG. 8 shows a real and corrected log obtained from a formation under the same conditions as in FIG. 6 except that the resistivity contrast between formation layers is just 2 (1 ohm-m for odd-numbered layers and 2 ohm-m for even-numbered layers). Eq. (7) gives a value α=0.065, i.e., the discrepancy is about 10%. Eq. (10) is not used to update the value of α. While the real part 802 of the raw signal reflects the rugosity only, the corrected signal 804 provides an acceptable image of the formation resistivity.

Figure 9:
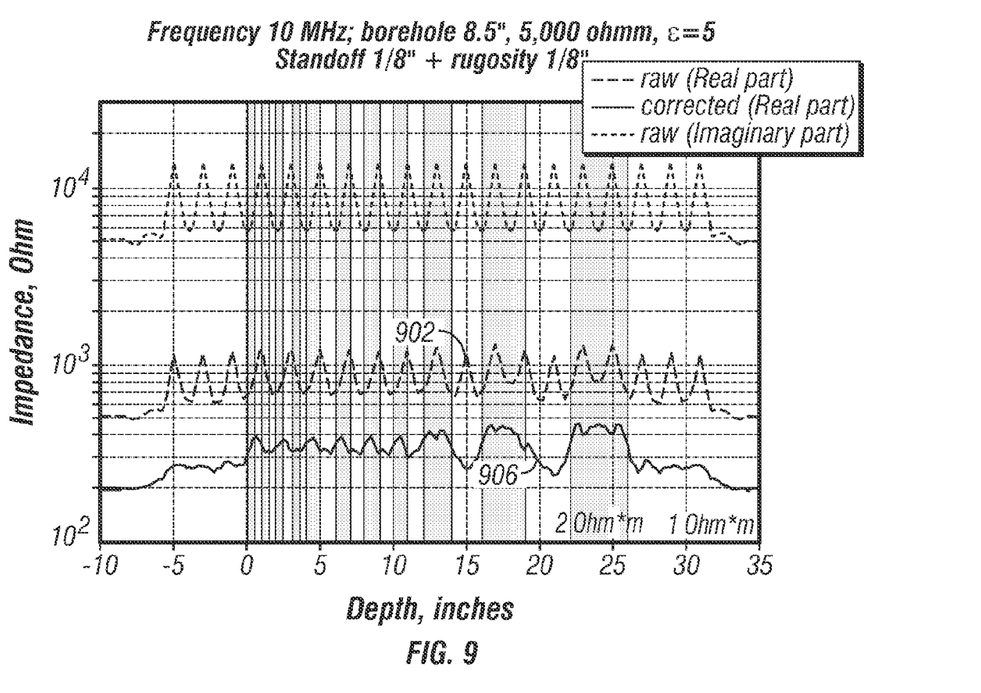

FIG. 9 shows raw and corrected logs obtained from a borehole with 8.5" diameter, with small (⅛" deep) uniformly periodic rugosity, crossing a layered formation such as in FIG. 6 with small contrast, ½₅" pad standoff. As in FIG. 8, the odd-numbered layers have a resistivity of 1 ohm-m and the even-numbered layers have a resistivity of 2 ohm-m. While the real part 902 of the raw signal reflects the rugosity only, the corrected signal 906 provides an acceptable image of the formation resistivity.

In one aspect, the method of the present disclosure filters out the part of the raw signal, ReZ, which directly correlates with the imaginary component ImZ. In another aspect of the present disclosure, this process may also be used to correct contaminations of another origin, but which have the same correlation.

In particular, similar correlation between real and imaginary components of the parasitic impedance may be observed when some phase error β is introduced by electronics. As a result, instead of a true impedance value Z, the tool reads an imperfect impedance $\tilde{Z}=Z(1+i\beta)$, where β is an unknown coefficient which is small enough to justify discarding of terms $\sim\beta^2$ and higher. One can use $ImZ \gg \beta ReZ$, since otherwise the impact of the phase error is negligible and correction is not needed. Thus, $Im\tilde{Z} \approx ImZ$, and $$\tilde{Z}=(R_f+ReZ_G+iImZ_G)(1+i\beta)=R_f+ReZ_G-\beta ImZ_G+iImZ=R_f+(\alpha-\beta)ImZ+iImZ \approx R_f+(\alpha-\beta)Im\tilde{Z}+iIm\tilde{Z} \qquad \text{Eq. (11),}$$

which gives $$R_f=Re\tilde{Z}-(\alpha-\beta)Im\tilde{Z} \qquad \text{Eq. (12).}$$

Eq. (12) coincides with Eq. (2), but instead of the α-parameter of the mud, a new parameter $\tilde{\alpha}=\alpha-\beta$ describes the joint impact of both the standoff and the electronic phase error. Thus, the method of the present disclosure automatically corrects for both standoff and electronics errors simultaneously and Eq. (7) may be used to give an estimate of $\tilde{\alpha}$.

Some observations on the electronics error can be made. First of all, the electronics phase error may be corrected if it is relatively stable within the ensemble of sensors. A similar requirement is applied for the mud parameter α. Secondly, unlike the original mud parameter α, the coefficient $\tilde{\alpha}$ can be negative. In these cases, the criterion of Eq. (8) has to be properly modified. Third, different sensor buttons may have different values of β. Thus, to correct for the phase error, the ensemble of sensors includes measurements made by one button only.

Figure 10:
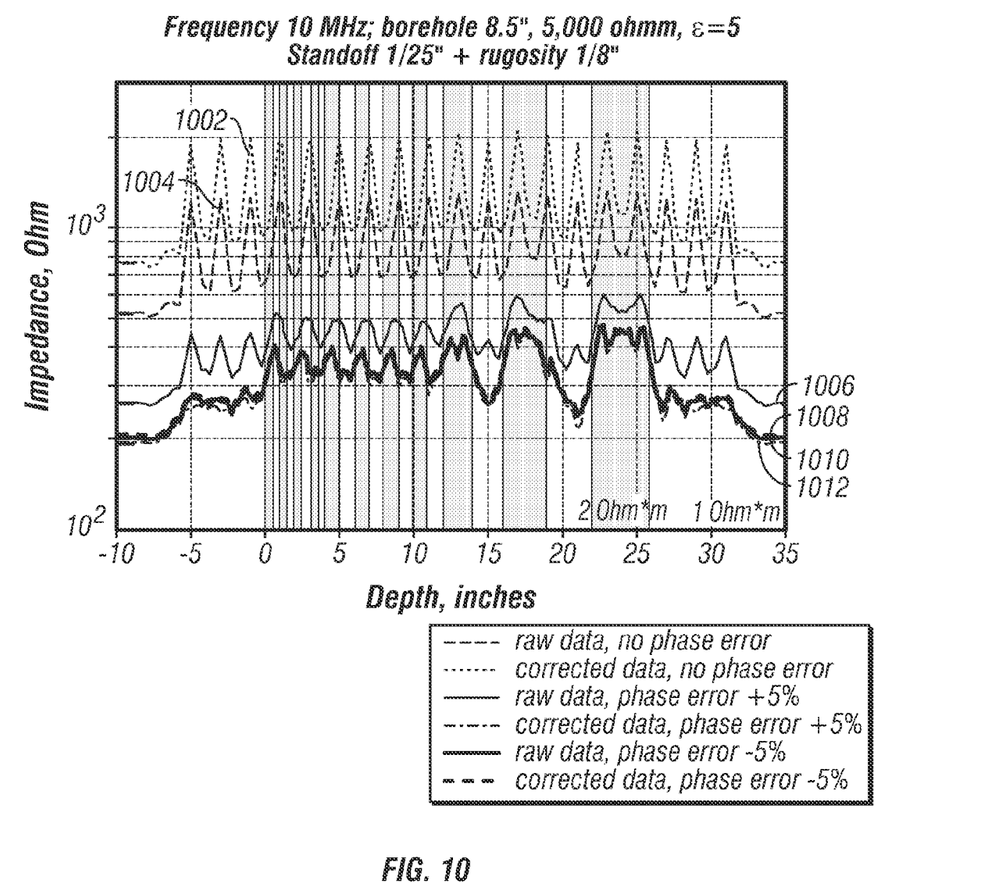
FIG. 10 shows an application of one aspect of the present disclosure to correct for the electronic phase error β.

FIG. 10 shows an application of one aspect of the present disclosure to correct for the electronic phase error β. Error β is introduced into the synthetic raw data of FIG. 9 and then the exemplary method without any modification or a special consideration of error β is applied to $\tilde{Z}$. For a phase error of β=+0.05, the method gives $\tilde{\alpha}$=0.0133, while the true value is $\tilde{\alpha}$=0.022, i.e., the discrepancy between real and calculated values is about 40%. Eq. (10) is not used to provide an update. For a phase error of β=−0.05, the method gave $\tilde{\alpha}$=0.112, while the true value is $\tilde{\alpha}$=0.122, i.e., the discrepancy is about 8%. Eq. (10) is not used to provide an update.

Note that for all three cases (β=0, +0.05, −0.05) the absolute value of the $\tilde{\alpha}$− discrepancy is the same. It has the high relative value for β=+0.05 due to the low value of $\tilde{\alpha}$ (in this case, the electronic error compensates 70% of the standoff impact).

The results for these three values of β are presented in FIG. 10. While the raw signals (1002, 1004 and 1006) corresponding to β=0, β=+0.05, and β=−0.05 vary significantly depending on the value of β and in all cases are badly contaminated, the corresponding corrected signals (1008, 1010 and 1012 lines) are nearly identical and provide an acceptable image.

While the embodiments described herein have been described for use with a wireline device, they or equivalent embodiments may equally be used with measurement-while-drilling (MWD) tool.

The operation of the transmitters and receivers, and the control of the drilling direction may be controlled by circuitry which may be conveyed downhole or located at a surface location. The circuitry may control and process of the data through, for example, execution of a program or set of instructions stored on a suitable machine-readable medium. The machine-readable medium may include ROMs, EPROMs, EAROMs, Flash Memories and Optical disks. Results of the processing, such as the estimated resistivity property, may be stored on a suitable medium.

The operation of the transmitters and receivers, and the control of the drilling direction may be controlled by the downhole processor and/or a surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The term "processor" as used herein is intended to include Field Programmable Gate Arrays (FPGAs). Results of the processing may be stored on a suitable medium.

While the foregoing disclosure is directed to the exemplary embodiments of the disclosure, various modifications will be apparent to those skilled in the art. It is intended that all such variations within the scope of the appended claims be embraced by the foregoing disclosure.

What is claimed is:

1. A method of estimating a resistivity property of an earth formation in a borehole filled with oil-based mud, the method comprising:
   conveying a logging tool into a borehole;
   measuring a plurality of impedance values of the earth formation, each of the plurality of impedance values being obtained at one of a plurality of measure electrodes on the logging tool;
   determining a coefficient related to an electrical property of the mud from the measured plurality of impedance values; and
   estimating the resistivity property of the formation from the determined coefficient.

2. The method of claim 1, wherein the coefficient is determined using a relationship of the form:

$$\alpha = \frac{\sum_{j=1}^{n}(A_j^{(1)} - A_j^{(2)})(B_j^{(1)} - B_j^{(2)})}{\sum_{j=1}^{n}(B_j^{(1)} - B_j^{(2)})^2}$$

where $\alpha$ is the coefficient, $A_j$ is a real part of a measured impedance value for a j-th signal pair of the plurality of impedance values and $B_j$ is an imaginary part of the measured impedance measured for the j-th signal pair of the plurality of impedance values.

3. The method of claim 2 further comprising updating the determined coefficient using $$\alpha_{updated} = \frac{(1-\delta)\text{Re}Z}{\text{Im}Z}$$

where Z is the complex impedance measured at a measure electrode and $\delta$ is a regularizing parameter.

4. The method of claim 1, further comprising correcting for a systematic electronic phase error.

5. The method of claim 1 further comprising conveying the logging tool into the borehole on a conveyance device selected from (i) a wireline, or (ii) a drilling tubular.

6. An apparatus configured to estimate a resistivity property of an earth formation in a borehole filled with oil-based mud, comprising:
   a logging tool configured to be conveyed into the borehole;
   a plurality of measure electrodes on the logging tool configured to measure a plurality of impedance values of the earth formation; and
   a processor configured to:
   (A) determine a coefficient related to an electrical property of the mud from the measured plurality of the impedance values, and
   (B) estimate the resistivity property of the formation using the determined coefficient.

7. The apparatus of claim 6, wherein the processor is configured to determine the coefficient using a relationship of the form:

$$\alpha = \frac{\sum_{j=1}^{N}(A_j^{(1)} - A_j^{(2)})(B_j^{(1)} - B_j^{(2)})}{\sum_{j=1}^{N}(B_j^{(1)} - B_j^{(2)})^2}$$

where $\alpha$ is the coefficient, $A_j$ is a real part of a measured impedance value for a j-th signal pair of the plurality of impedance values and $B_j$ is an imaginary part of the measured impedance measured for the j-th signal pair of the plurality of the values.

8. The apparatus of claim 7, the processor is further configured to update the determined coefficient using $$\alpha_{updated} = \frac{(1-\delta)\text{Re}Z}{\text{Im}Z}$$

where Z is the complex impedance measured at a measure electrode and $\delta$ is a regularizing parameter.

9. The apparatus of claim 6, wherein the processor is further configured to correct for a systematic electronic phase error.

10. The apparatus of claim 6, wherein the logging tool is further configured to be conveyed into the borehole on a conveyance device selected from (i) a wireline, or (ii) a drilling tubular.

11. A non-transitory computer-readable medium product having stored thereon instructions that when read by a processor cause the processor to execute a method, the method comprising:
   determining a coefficient related to an electrical property of a mud in a borehole in an earth formation from a plurality of impedance values obtained using measurements made by a plurality of measure electrodes on a logging tool in the borehole, and
   estimating a resistivity property of the formation using the determined coefficient.

12. The non-transitory computer-readable medium product of claim 11 further comprising at least one of (i) a Read Only Memory (ROM), (ii) an Erasable Programmable Read Only Memory (EPROM), (iii) an electrically erasable programmable read only memory (EEPROM), (iv) a flash memory, or (v) an optical disk.

* * * * *